Dec. 17, 1957 V. B. MORRIS, JR 2,816,707
HYPSOMETER EVALUATOR
Filed June 21, 1954 3 Sheets-Sheet 1

INVENTOR
Vernon B. Morris, Jr.
BY K. Y. Doub.
ATTORNEY

Dec. 17, 1957  V. B. MORRIS, JR  2,816,707
HYPSOMETER EVALUATOR
Filed June 21, 1954  3 Sheets-Sheet 2
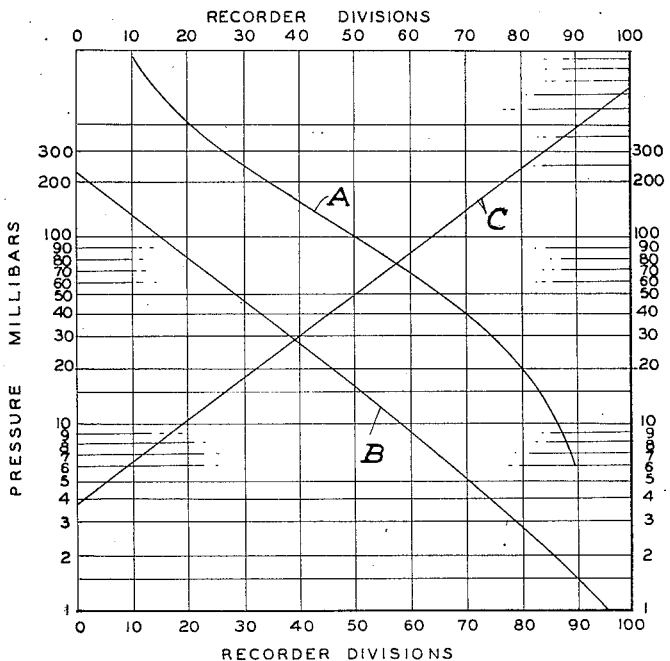
Fig. 4.
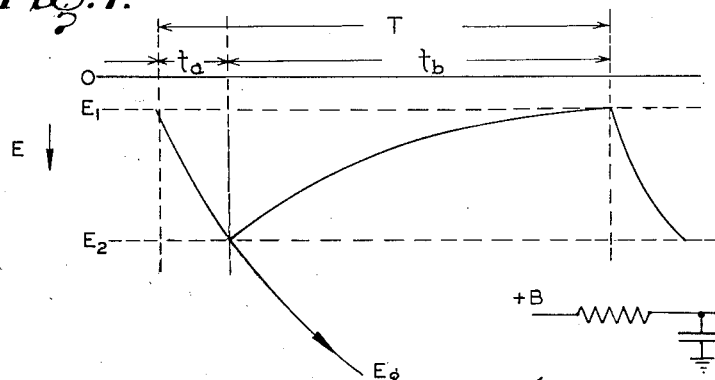
Fig. 7.
Fig. 7a.
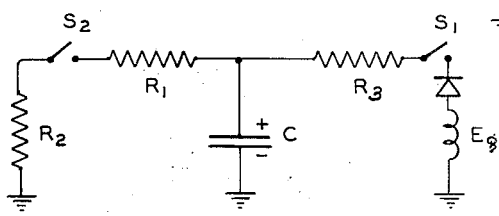
Fig. 8.
INVENTOR
Vernon B. Morris, Jr.
BY K. G. Doub.
ATTORNEY Dec. 17, 1957   V. B. MORRIS, JR   2,816,707
HYPSOMETER EVALUATOR
Filed June 21, 1954   3 Sheets-Sheet 3
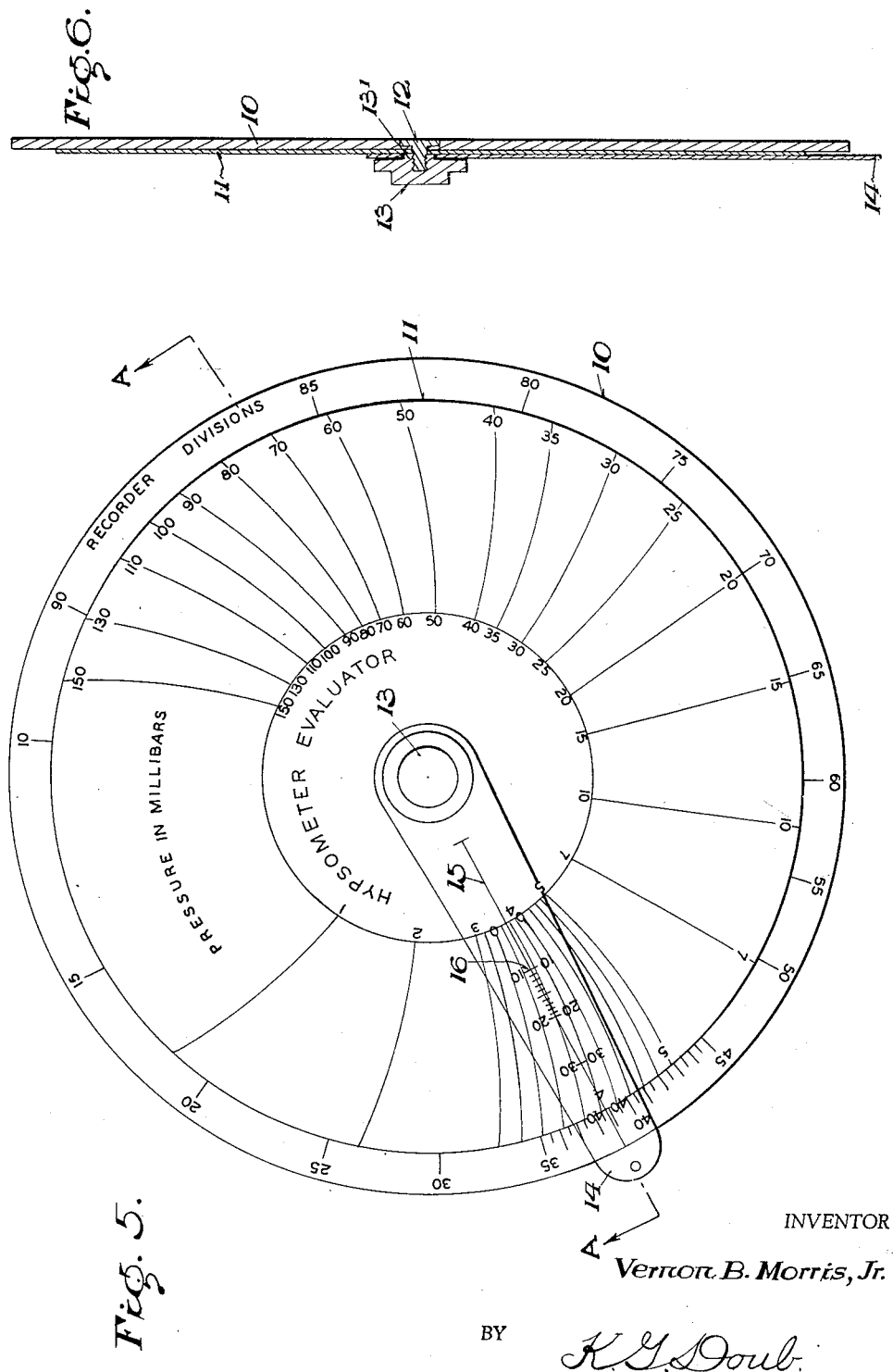
INVENTOR
Vernon B. Morris, Jr.
BY
K. G. Doub
ATTORNEY

United States Patent Office 2,816,707
Patented Dec. 17, 1957

2,816,707

HYPSOMETER EVALUATOR

Vernon Byron Morris, Jr., Baltimore, Md., assignor to Bendix Aviation Corporation, Baltimore, Md., a corporation of Delaware Application June 21, 1954, Serial No. 438,094

3 Claims. (Cl. 235—84)

This invention relates to a slide rule type device for evaluating indicia representing signals varying in magnitude with variations in a condition being measured; it was devised primarily for evaluating flight records of atmospheric sounding apparatus, commonly known as a radiosonde, employing a hypsometer to sense changes in pressure, and radio transmission apparatus for telemetering such changes to a ground station. In such apparatus, the temperature of the saturated vapor given off by the boiling liquid with which the hypsometer is charged, for example, liquid carbon disulphide, may be measured by a suitable electrical conductor or resistance element having a high negative temperature coefficient of resistance, any changes in the resistance across said element being reflected by related variations in resistance in the grid circuit of a blocking oscillator whose repetition rate is determined by the grid circuit time constant, or resistance-capacity product, the resultant frequency variations being converted into signals indicative of the temperature of the boiling hypsometer liquid. The conductor or resistance element may conveniently take the form of a thermistor such as that made in accordance with the teaching of the Sanborn patent, No. 2,590,894.

The modified radio frequency signals sent out by the telemetering apparatus are received by suitable radio receiving and recording apparatus which demodulate, amplify and record the audio frequency of the signals on a continuous sheet of recorder paper marked off in divisions representing units in the sense of time. The audio frequency divisions on the recorder paper are numbered in sequence along the abscissa axis proportional to audio frequency in cycles per second. For example, the divisions may be numbered in bi-cycles per second, in which event 75 divisions would represent 150 cycles per second. An example of a recorder which has been used in practice is that illustrated in Patent No. 2,374,653, issued May 1, 1945. In this instance the indicia representing signals is printed by a tapper or printing bar which marks or prints once each time a rotating photocell-energizing light beam is interrupted by the pointer of a frequency meter, which rotates through a given arc in response to variations in frequency of the signals. Thus, the pointer may have a starting or zero position at the zero recording division, and as the frequency increases, the pointer will swing clockwise through an angle proportional to a given number of divisions on the recorder chart or paper; and as the pointer moves it is continually being "scanned" by the rotating light beam. At the same time a drive motor advances the chart paper at a given rate, for example, 0.4" per minute in a direction paralleling the ordinate axis of the chart. Under these conditions, should the audio frequency input through the frequency meter remain constant at 150 cycles per second, the tap bar would print or mark every two seconds and produce successive marks on the chart paper at the 75th division; and there would be 30 successive marks within each time ordinate of 0.4" on the chart paper.

After the flight record has been recorded in audio frequency values, it becomes necessary to interpret such values in terms of pressure. In a hypsometer type radiosonde, in correlating audio frequency or recorder division values with pressure, there are three relationships which must be determined and then correlated to arrive at a reasonably accurate interpretation: (1) resistance (in ohms) versus recorder divisions; (2) resistance (in ohms) of the electrical conductor or resistance element versus temperature; and (3) vapor pressure of the hypsometer liquid versus vapor temperature, note Figs. 1, 2 and 3. The resistance versus recorder division curve may be, and usually is, established empirically for a particular design or make of radiosonde. Since recorder divisions are fixed by the design of the radio transmitter, and vapor pressure is a unique function of the temperature of the liquid with which the hypsometer is charged, relationships 1 and 3 remain fixed once they are plotted for a transmitter and hypsometer of a given design, note Fig. 4 wherein the curves of Figs. 1 and 3 are indicated at A and B on a chart plotting pressure in millibars and resistance in ohms against recorder divisions. However, in order to arrive at a pressure reading, relationships 1 and 3 must be correlated through 2, and the resistance versus temperature characteristic curve of different thermistors normally varies within certain limits, both as to its nominal value and slope, when produced on a quantity basis, note the family of curves of Fig. 2. For example, if in comparing two thermistors it is found that the resistances of both are equal at some arbitrary check point temperature, say 30 degrees C., then the thermistors are said to have equal "nominal" resistances, even though they may have unequal resistances at other temperatures. The "nominal value" of resistance of a thermistor, therefore, may be considered as the value which exists when the thermistor is subjected to a given temperature at a given current. If two thermistors have equal or unequal nominal resistances and equal negative temperature coefficients of resistance, then the thermistors have equal "slopes," i. e., the slopes of the curves of Fig. 2 would be substantially the same. If two thermistors have equal or unequal nominal resistances and unequal negative temperature coefficients of resistance, they are considered to have unequal slopes, in which event the curves of Fig. 2 would vary in slope with respect to one another. Hence, in order to obtain an accurate pressure evaluation, the resistance versus temperature characteristic must be determined for each thermistor. The curves of Figs. 1 and 3 and any selected curve of Fig. 2, can be plotted on a chart such as that illustrated in Fig. 4 and the pressure values obtained as follows:

(1) Find observed recorder division values (audio frequency mark on chart paper) on curve A.

(2) From point on curve A move horizontally (left or right) to curve C.

(3) From point on curve C move vertically (up or down) to curve B.

(4) From point on curve B move horizontally (left or right) to pressure scale. This is the pressure corresponding to the observed recorder division value.

For example, let it be assumed that the tapper bar of the recorder makes a mark or a series of vertically aligned marks on the recorder paper along recorder division line 50. Then if we start on curve A where recorder division line number 50 intersects curve A, this will be the starting point of instruction number 1 above. If this point is traced horizontally to the right on curve C, then downwardly to curve B, and to the left or right horizontally to the pressure scale, as in instructions 2, 3 and 4 above, the evaluated audio frequency will be approximately 8 millibars.

If curves A and B were the only factors to be considered in the pressure evaluation operation, then one chart such as that shown in Fig. 4 would serve for a production line of transmitters and hypsometers, but since each thermistor of a production line may have a different resistance versus temperature characteristic, each hypsometer requires a separate or individual calibration chart. Furthermore, evaluation by way of a chart involves three relationships and as a consequence is time-consuming and, to some extent at least, requires technically-trained personnel and is subject to errors, as in all calculations wherein the human factor plays the major role.

The primary object of the present invention, therefore, is to provide a device for evaluating flight records of hypsometer radiosondes, which will eliminate the preparation of separate charts for each hypsometer and at the same time will simplify the pressure evaluating operation and render the latter less subject to errors.

The foregoing and other objects and advantages will become apparent in view of the following description taken in conjunction with the drawings, wherein:

Figures 1 to 4, inclusive, show the curves to which reference has previously been made;

Figure 5 is a plan or face view of an evaluator constructed in accordance with the invention;

Figure 6 is a substantially central cross-sectional view of Figure 5; and

Figure 1:
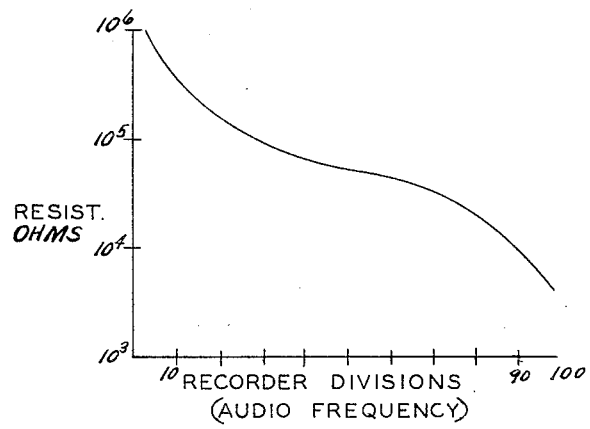

Figures 7, 7–A and 8 are hypothetical circuit diagrams for use in conjunction with the mathematical analysis of the resistance versus recorder division or audio frequency curve of Fig. 1.

Referring to Figs. 5 and 6, a rotating slide rule type of evaluator embodying the features of the invention is shown and comprises a flat, circular plate 10 having a chosen or arbitrary number of recorder divisions or audio frequency values printed on its outer rim or edge. These values should be sufficient in number to cover the required range of recorder divisions for a given design of transmitter and should be spaced as hereinafter set forth. In the example shown, there are 90 divisions. Another plate 11, of reduced diameter with respect to the base plate 10, is mounted for rotation relatively to the latter on the smooth portion of a screw 12, having is head countersunk in the center of plate 10 and a threaded portion adapted to receive a clamp or set nut 13, and this inner plate is marked off with any selected number of pressure scale lines varying in curvature or configuration and identified by numerals representing pressure values in millibars.

A hair line cursor 14 is mounted for rotation on a boss 13′ formed on the inner side of the nut 13 and is provided with a radial indexing line 15 and a discrete number of transverse or intersecting slope-indexing lines 16. The boss 13′ is dimensioned in a manner such that when the nut 13 is tightened down, plate 11 will be locked at a selected position with respect to plate 10, with the cursor free for selective rotation or angular adjustment with respect to the locked plates.

Reverting now to the circumferential spacing of the audio frequency or recorder divisions on the periphery or outer edge of the plate 10, these should be so spaced as to provide a predetermined relationship between the said recorder divisions and the pressure scale lines of the plate 11. In order to establish such predetermined relationship, it becomes necessary to linearize the resistance versus recorder division curve of Fig. 1 or curve A of Fig. 4. In other words, curve A must bear a linear relationship to some function of the recorder divisions traversed by said curve. This may be done empirically by scaling off the curve and assigning the appropriate number of recorder divisions to a corresponding length or portion of the curve, or by any other suitable "drafting" method.

A mathematical analysis of the resistance versus recorder division or audio curve is set forth below, reference being had to Figs. 7, 7–A and 8:

In any oscillator, the frequency is to the inverse relationship of the period (in time):

(1)
$$f = \frac{1}{T}$$

where T is the period for one oscillation.

(2) This period is composed of two actions:
(a) Charging up the storage capacitor, $t_a$.
(b) Discharging the storage capacitor, $t_b$.
(3) $T = t_a + t_b$.
(4) The charge-up period, $t_a$ is independent of the value of discharge resistance when $R_1 + R_2$ is much greater than $R_3$, see Figures 7 and 7–A.

Typical circuit values:

$$C = .02 \times 10^{-6} \text{ farads}$$
$$R_1 = 112{,}400 \text{ ohms}$$
$$R_2 = 0 \text{ to infinity}$$
$$t_a = 70 \text{ microseconds (a constant)}$$
$$E_1 = 2.6 \text{ volts}$$
$$E_2 = 26.6 \text{ volts}$$

(5) During $t_a$, $V_1$ charges C, which is equivalent to closing $S_1$. $S_1$ is always closed at $E_1$ and opened at $E_2$. Likewise discharge is equivalent to closing $S_2$ at $E_2$ and opening it at $E_1$. Actually $S_2$ is always closed, and since $R_1 + R_2$ is greater than $R_3$, no appreciable error is introduced.

(6) The value of $t_a = 70 \times 10^{-6}$ seconds.

(7) The value of $$t_b = C(R_1 - R_2) \ln \frac{E_2}{E_1}$$

(8) $$T = 70 \times 10^{-6} + C(R_1 - R_2) \ln \frac{E_2}{E_1}$$

$$\frac{1}{f} = T = C \ln \frac{E_2}{E_1} \left[ \frac{70 \times 10^{-6}}{C \ln \frac{E_2}{E_1}} + R_1 + R_2 \right]$$

(9) $$f = \frac{\frac{1}{C \ln \frac{E_2}{E_1}}}{\frac{70}{C \ln \frac{E_2}{E_1}} + R_1 + R_2} = \frac{A}{B + R_2}$$

where $$A = \frac{1}{C \ln \frac{E_2}{E_1}}$$

$$B = \frac{70}{C \ln \frac{E_2}{E_1}} + R_1$$

$E_1 = 2.6$ volts (approx.) typical values
$E_2 = 26$ volts (approx.) typical values $$f = \frac{21.9 \times 10^6}{1500 + 112{,}400 + R_2} = \frac{21.9 \times 10^6}{113{,}900 + R_2}$$

(10) Empirical method:

A large number of radiosonde transmitters were checked for the following frequency versus resistance relationship, resulting in average data as follows:

| $R_2$, ohms | f, C. P. S. |
|---|---|
| 0 | 190 |
| 112,500 | 95 |

Since the radiosonde transmitter resistance versus frequency relationship is of the form $$f = \frac{A}{B+R_2}$$

as defined in 9 above, two simultaneous equations can be solved as follows, using average data in 10 above:

(11) $\quad f = \frac{A}{B+R_2}$; $\quad 190 = \dfrac{A}{112,400 + \dfrac{70}{C \ln \dfrac{E_2}{E_1}} + 0}$

(12) $\quad f = \frac{A}{B+R_2}$; $\quad 95 = \dfrac{A}{112,400 + \dfrac{70}{C \ln \dfrac{E_2}{E_1}} + 112,500}$ or $$95 = \dfrac{A}{224,900 + \dfrac{70}{C \ln \dfrac{E_2}{E_1}}}$$

hence $$A = 95 \left[ 224,900 + \dfrac{70}{C \ln \dfrac{E_2}{E_1}} \right]$$

Substituting this in 11:

$$190 = \dfrac{95 \left[ 224,900 + \dfrac{70}{C \ln \dfrac{E_2}{E_1}} \right]}{112,400 + \dfrac{70}{C \ln \dfrac{E_2}{E_1}}}$$

and solve for $$\dfrac{70}{C \ln \dfrac{E_2}{E_1}}$$

$$190 \times 112,400 + 190 \left[ \dfrac{70}{C \ln \dfrac{E_2}{E_1}} \right] = 95 \times 224,900 + 95 \left[ \dfrac{70}{C \ln \dfrac{E_2}{E_1}} \right]$$

Dividing by 95:

$$2(112,400) + 2 \left[ \dfrac{70}{C \ln \dfrac{E_2}{E_1}} \right] = 224,900 + 1 \left[ \dfrac{70}{C \ln \dfrac{E_2}{E_1}} \right]$$

(13) $\quad \dfrac{70}{C \ln \dfrac{E_2}{E_1}} = 100$

Substituting 100 in 12 for $$\dfrac{70}{C \ln \dfrac{E_2}{E_1}}$$

gives the value of A, which is 21,370,000. If $A = 21,370,000$ and $$\dfrac{70}{C \ln \dfrac{E_2}{E_1}} = 100$$

then $$f = \dfrac{21,370,000}{100 + 112,400 + R_2} = \dfrac{21,370,000}{112,500 + R_2}$$

To linearize the equation $$f = \dfrac{A}{B+R_2}$$

$$R_2 + B = \dfrac{A}{f}$$

$$R_2 = \dfrac{A - Bf}{f}$$

$$\log_{10} R_2 = \log_{10} \left[ \dfrac{A - Bf}{f} \right]$$

Differentiating both sides with respect to $f$:

$$d[\log_{10} R_2] = \left[ \dfrac{1}{\dfrac{A-Bf}{f}} \right] \left[ \dfrac{-A \log_{10} e}{f^2} \right] df = \dfrac{-A \log_{10} e \, df}{f(A-Bf)}$$

Let $C = -A \log_{10} e$ $$d \log_{10} R_2 = \dfrac{C \, df}{f(A-Bf)}$$

It is desired to find an angle (in minutes) which equals $\theta$ a function of frequency such that:

$$\log_{10} R_2 = K\theta + E$$

Differentiating both sides with respect to $\theta$:

$$d \log_{10} R_2 = K d\theta \quad \text{or} \quad d\theta = \dfrac{C \, df}{Kf(A-Bf)}$$

Integrating both sides:

$$\theta = \dfrac{C}{K} \int \dfrac{df}{f(A-Bf)} + g$$

$$\theta = \dfrac{-C}{K} \dfrac{1}{A} \log_{10} \left[ \dfrac{A-Bf}{f} \right] \dfrac{1}{\log_{10} e} + g$$

$$\theta = \dfrac{-C}{AK \log_{10} e} \log_{10} \left[ \dfrac{A-Bf}{f} \right] + g$$

But $$C = -A \log_{10} e$$

$$\theta = \dfrac{1}{K} \log_{10} \left[ \dfrac{A-Bf}{f} \right] + g$$

Let $$\dfrac{1}{K} = D$$

$$\theta = D \log_{10} \left[ \dfrac{A-Bf}{f} \right] + g$$

(14) $\quad \theta = D \log_{10} \left[ \dfrac{21,370,000 - 112,500 f}{f} \right] + g$ where $\theta$ may represent an angle in minutes, for a circular evaluator, and which angle has as one leg thereof an arbitrarily-chosen starting reference line radiating from the center of disc 10 or 11:

If we set
$\theta = 0$ when $f = 20$
and $\theta = 340°$ when $f = 180$,
$\theta = (340)(60)$ minutes
$\theta = 20,400$ when $f = 180$ Substituting the above values for $\theta$ and $f$ in (14):

$$\theta = D \log_{10} \left[ \dfrac{21,370,000 - 112,500 (20)}{20} \right] + g$$

$$20,400 = D \log_{10} \left[ \dfrac{21,370,000 - 112,500 (180)}{180} \right] + g$$

Solving these simultaneous equations for D and g:

$$D = -9,330$$
$$g = 55,800$$

Each value of theta ($\theta$) obtained for the various selected frequencies substituted for $(f)$ over the entire frequency range has as one leg or side thereof the chosen starting reference line.

Figure 2:
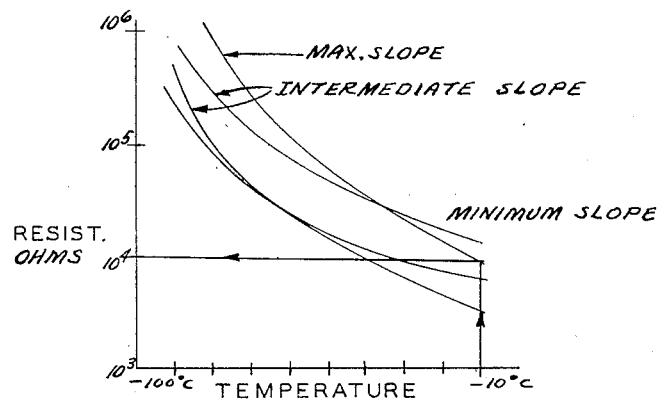
Figure 3:
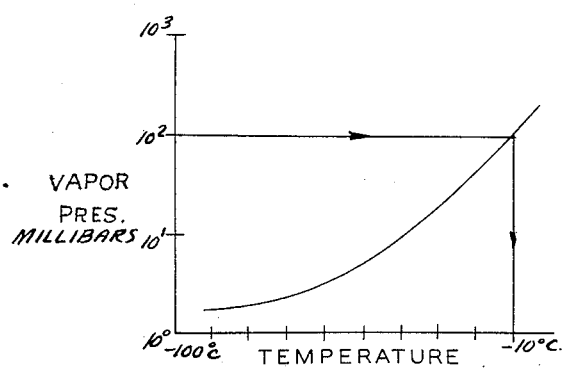

In regard to the pressure index lines of the plate 11 of the evaluator, these may be plotted as follows:

Any number of such lines may be chosen, this being more or less arbitrary depending upon the choice of the user. One method of plotting the pressure lines is to arbitrarily select a thermistor resistance characteristic curve having a slope above the range of operative slopes for the transmitter with which the hypsometer is to be used. This curve is set up in a chart plotting resistance against temperature, as in Fig. 2. We can assume that the vapor pressure versus temperature characteristics of the hypsometer liquid had already been plotted as in the curve of Fig. 3. For a starting pressure, let it be assumed that 100 millibars is selected. This need not necessarily represent the upper pressure limit since this is a characteristic of the design of the hypsometer. In the evaluator shown in Fig. 5, the upper limit is 150 millibars. If the ordinate of Fig. 3 is scaled in millibars and a line traced horizontally from the 100 millibar point to the point of intersection with the vapor pressure versus temperature curve and then vertically down to the abscissa, we will arrive at a temperature which could, for example, be minus 10 degrees C., note the arrow lines in Fig. 3. If we now go to Fig. 2 and select a minus 10 degrees C. temperature point along the abscissa and trace vertically to the point of intersection with the maximum-slope resistance versus temperature curve and then horizontally to the ordinate, we will arrive at a resistance of, say 10,000 ohms, note the arrow lines in Fig. 2. This resistance value is then substituted for "$R_2$" in Equation 9 above to determine the corresponding audio frequency value, and this latter value is then substituted for "$f$" in Equation 14 to arrive at an angle in minutes, which angle is established with reference to an arbitrarily selected initial or zero reference line drawn from the diametric center of the plate 11 to the periphery of the latter. The point where the opposite leg of the angle intersects the periphery of said plate is then marked off as the outer terminus of the pressure line, which in the example here given would be the outer terminus of the 100 millibar line.

The foregoing series of steps may then be repeated to establish the outer termini of pressure lines of progressively reduced values in millibars until a value is reached which is below the operational value for the particular hypsometer being used, and each point is laid off or indicated on a common circle adjacent the outer edge of the plate 11. Each succeeding angle is plotted from the original reference or zero reference line.

Next, the location of the inner end or terminus of each pressure line should be established. To do this, we set up a curve in Fig. 2 having a minimum slope characteristic below the operative slope. Then at the −10° C. point on the abscissa, move vertically to a point of intersection with the minimum-slope curve and then horizontally to the ordinate for the resistance value, which in this instance would be approximately 8,000 ohms; and this value is substituted for "R" in Equation 9 to establish the corresponding frequency value and the latter then substituted for "$f$" in Equation 14 to arrive at the appropriate angle in minutes. This angle is then set up, with the zero reference line constituting one leg of the angle; and the point of intersection of the opposite leg of the angle with an inner circle concentric with the aforesaid outer circle (note the inner circle of Fig. 5) constitutes the inner terminus of the 100 millibar line. The foregoing steps are then repeated to establish the inner termini of the remaining pressure lines.

We now have the outer and inner termination points of the pressure lines laid out on a pair of concentric circles, but to obtain at least an approximately correct pressure curve configuration, one or more intermediate points must be established and laid out on circles concentric to and lying between the outer and inner circles. This can be done by repeating the foregoing steps with a resistance versus temperature curve having a mean or intermediate slope with respect to the aforesaid maximum and minimum slope curves. The points thus laid out on the outer, inner and intermediate circles are then connected to arrive at the pressure lines of the plate 11. Obviously the more values established for each curve along intermediate circles, the greater will be the accuracy of configuration of the pressure lines.

Other methods may be adopted. Thus the outer, inner and intermediate slope points may be set up for one pressure line before proceeding with the next, or the slopes of the respective lines may be established at least in part by "scaling" methods, the particular method followed being a matter of expediency.

The nominal resistance value (heretofore defined) of the particular thermistor being used will determine the proper relationship (lock-in position) between the recorder division plate 10 and the pressure line plate 11. Referring to Fig. 4, the curve C will vary in its relation to the recorder or audio frequency values, and also with relation to curves A and B, with variations in the nominal resistance of the thermistor from which curve C is plotted. In practice, there will be a given range of recorder or audio frequency division for a given hypsometer. For example, assume the range covers 90 to 10 divisions and an intermediate point along curve C is chosen and which point aligns with the 70th recorder division. Then if we follow the 70th division line down to where it intersects curve A, then to the left where the horizontal chart division line intersects curve C and down to where the vertical line intersects curve B, we find the latter point of intersection is the 20 millibar pressure line. The lock-in setting, then, would be where the 20 millibar pressure line on plate 11 aligns with the 70th recorder division line on plate 10. Evaluators for hypsometers utilizing thermistors having different nominal resistance values may have different lock-in points.

The index lines 16 of the cursor may be any given or chosen number in accordance with a reasonable degree of accuracy in reading. As shown, the slope indexing lines 16 are spaced so that they are approximately 1/20 of an inch apart. Having determined the slope of the particular thermistor which is being used for each hypsometer, such slope will determine which of the lines 16 is to be matched with the pressure lines in reading the evaluator.

*Instructions for use and operation*

Each thermistor for each hypsometer is tested to ascertain its resistance characteristics, that is its nominal resistance and slope. As far as the liquid with which the hypsometer is charged is concerned, assuming the same type of liquid to be used for a given number or production line of hypsometers, then the vapor pressure versus temperature characteristics of the liquid will remain constant. After the resistance values of the thermistor have been found, the nominal resistance of the thermistor will determine the location or angular adjustment of the inner plate 11 with respect to the outer plate 10 as heretofore explained; and the slope of the thermistor will determine which one of the index lines of the group 16 will intersect the thermistor curve or radial pressure line whose characteristics are similar, or more nearly similar, to the resistance characteristics of the thermistor. Each hypsometer may be provided with a tag stating which pressure line is to be radially aligned with which recorder division, and also which index line is to be read in accordance with the particular slope of the thermistor. Thus, in the position of the parts shown in Fig. 5, the tag on the hypsometer would state that 20 millibars should be aligned with the 70th recorder division line. This may be facilitated by utilizing the hair line 15 of the cursor to ensure correct alignment. The plates 10 and 11 may now be locked together by tightening down the screw 13, leaving the cursor free for rotation at the will of the operator.

To evaluate a flight record, the hair line of the cursor is set at the recorder division in which the tapper bar of the recorder has marked or printed in response to one or more audio frequency impulses. For example, in the position of the cursor 14 in Fig. 5, the hair line has been set at 38.8 recorder division, which is slightly past the fourth millibar pressure line. If the instructions on the hypsometer tag call for a reading of index line 18, then the pressure evaluated would be 3.9 millibars.

The evaluator as disclosed herein, while preferably of the circular or disc type, may be comprised of parallel relatively movable slides having thereon the indicia relating to recorder divisions and associated pressure lines in the same manner as the discs 10 and 11 of Fig. 5, such arrangement being obvious in view of the teaching of the disclosure. The foregoing and other changes in construction and design may be adapted without departing from the scope of the invention as defined by the appended claims.

What is claimed and desired to be secured by United States Letters Patent is:

1. A slide rule device for evaluating hypsometer flight records from data transmitted by airborne telemetering equipment and received and recorded by radio receiving and recording apparatus wherein audio frequency signals transmitted by a modulated radio frequency carrier wave are responsive to changes in resistance of an electrical resistance element subjected to temperatures varying with variations in the temperature of the boiling liquid with which the hypsometer is charged, said signals being recorded on a chart marked off in audio frequency divisions related to the modulation frequency, comprising a first slide rule member marked off in audio frequency divisions having a predetermined relation to those of said chart, a second slide rule member having thereon a family of pressure lines the contours of which vary with variations in the resistance-versus-temperature characteristic of a resistance element common to a plurality of hypsometers charged with liquid possessing a given vapor pressure-versus-temperature characteristic, said members being relatively adjustable to establish a predetermined setting between the pressure lines and audio frequency divisions delineated thereon, and a cursor having thereon a plurality of indexing lines representing a plurality of "slopes" of resistance-versus-temperature curves.

2. A slide rule device for evaluating hypsometer flight records from data transmitted by airborne telemetering equipment and received and recorded by radio receiving and recording apparatus wherein audio frequency signals transmitted by a modulated radio frequency carrier wave are responsive to changes in resistance of an electrical resistance element subjected to temperatures varying with variations in the temperature of the boiling liquid with which the hypsometer is charged, said signals being recorded on a chart marked off in audio frequency divisions related to the modulation frequency, comprising a first slide rule member marked off in audio frequency divisions having a predetermined relation to those of said chart, a second slide rule member having thereon a family of pressure lines the contours of which vary as a function of the resistance-versus-temperature characteristic curve of a resistance element common to a plurality of hypsometers charged with liquid possessing a given vapor pressure-versus-temperature characteristic, said members being relatively adjustable to establish a predetermined setting between the pressure lines and audio frequency divisions delineated on said members, and a cursor having thereon a plurality of indexing lines representing a plurality of "slopes" of resistance-versus-temperature curves.

3. A slide rule device for evaluating hypsometer flight records from data transmitted by airborne telemetering equipment and received and recorded by radio receiving and recording apparatus wherein audio frequency signals transmitted by a modulated radio frequency carrier wave are responsive to changes in resistance of an electrical resistance element subjected to temperature varying with variations in the temperature of the boiling liquid with which the hypsometer is charged, said signals being recorded on a chart marked off in audio frequency divisions proportional to the modulation frequency, comprising a first slide rule member in the form of a disc having the peripheral portion thereof marked off in audio frequency divisions bearing a predetermined relation to those of said chart, a second slide rule member in the form of a companion disc having thereon a family of pressure lines emanating from a common center and the contours of which vary as a function of the resistance-versus-temperature characteristic curve of a resistance element common to a plurality of hypsometers charged with a liquid possessing a given vapor-pressure-versus-temperature characteristic, said discs being relatively adjustable to establish a predetermined setting between the pressure lines and audio frequency divisions delineated thereon, and a cursor mounted for rotation on an axis common to said discs and having thereon a plurality of index lines representing a plurality of "slopes" of resistance-versus-temperature curves.

References Cited in the file of this patent

UNITED STATES PATENTS

| | | |
|---|---|---|
| 2,379,931 | Schaevitz | July 10, 1945 |
| 2,544,224 | Hachmuth | Mar. 6, 1951 |